Nov. 14, 1961   R. C. STANLEY   3,008,439
PIPE ALIGNING AND SUPPORTING APPARATUS
Filed June 2, 1958   6 Sheets-Sheet 2

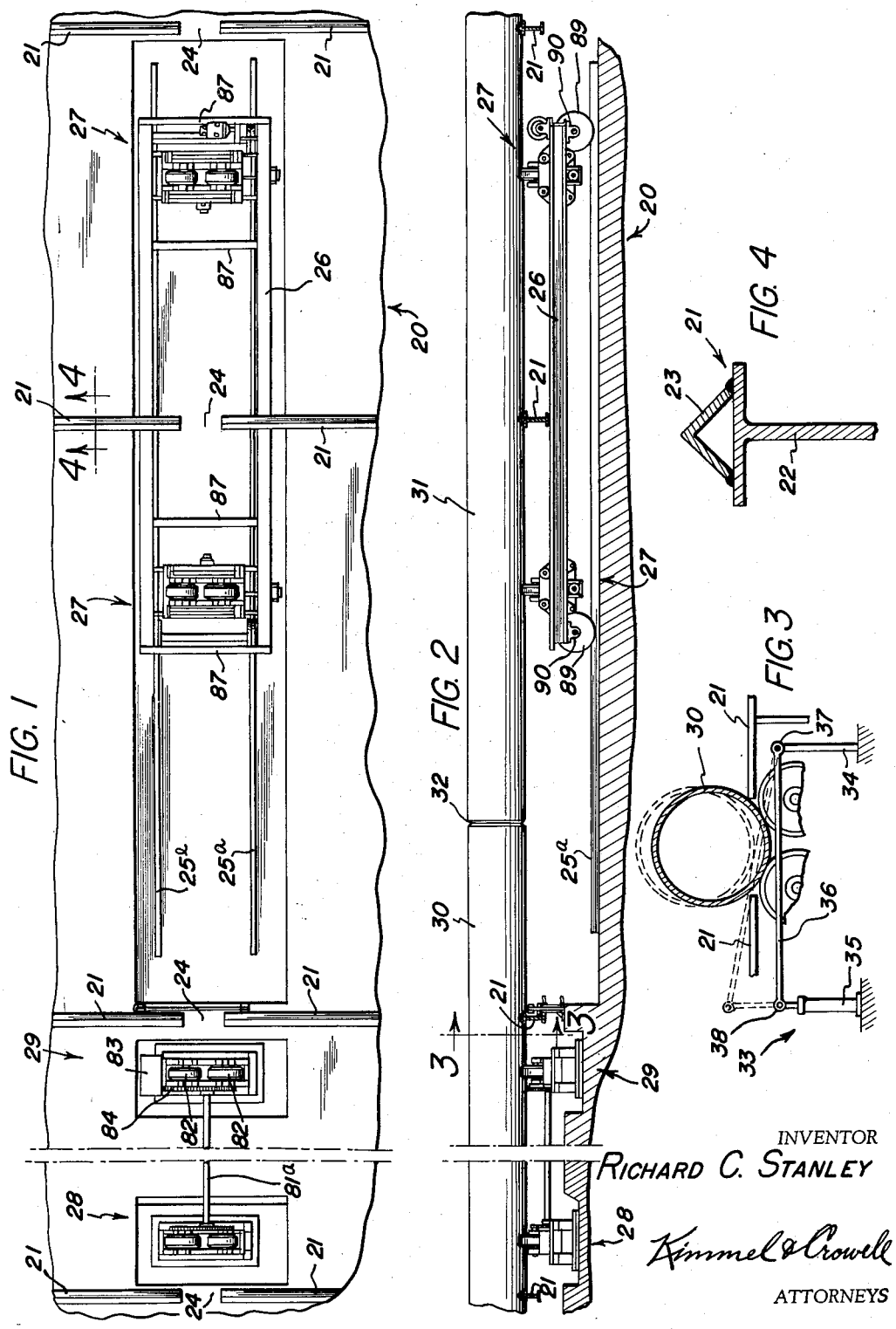

INVENTOR.
RICHARD C. STANLEY
BY
Kimmel & Crowell
ATTORNEYS

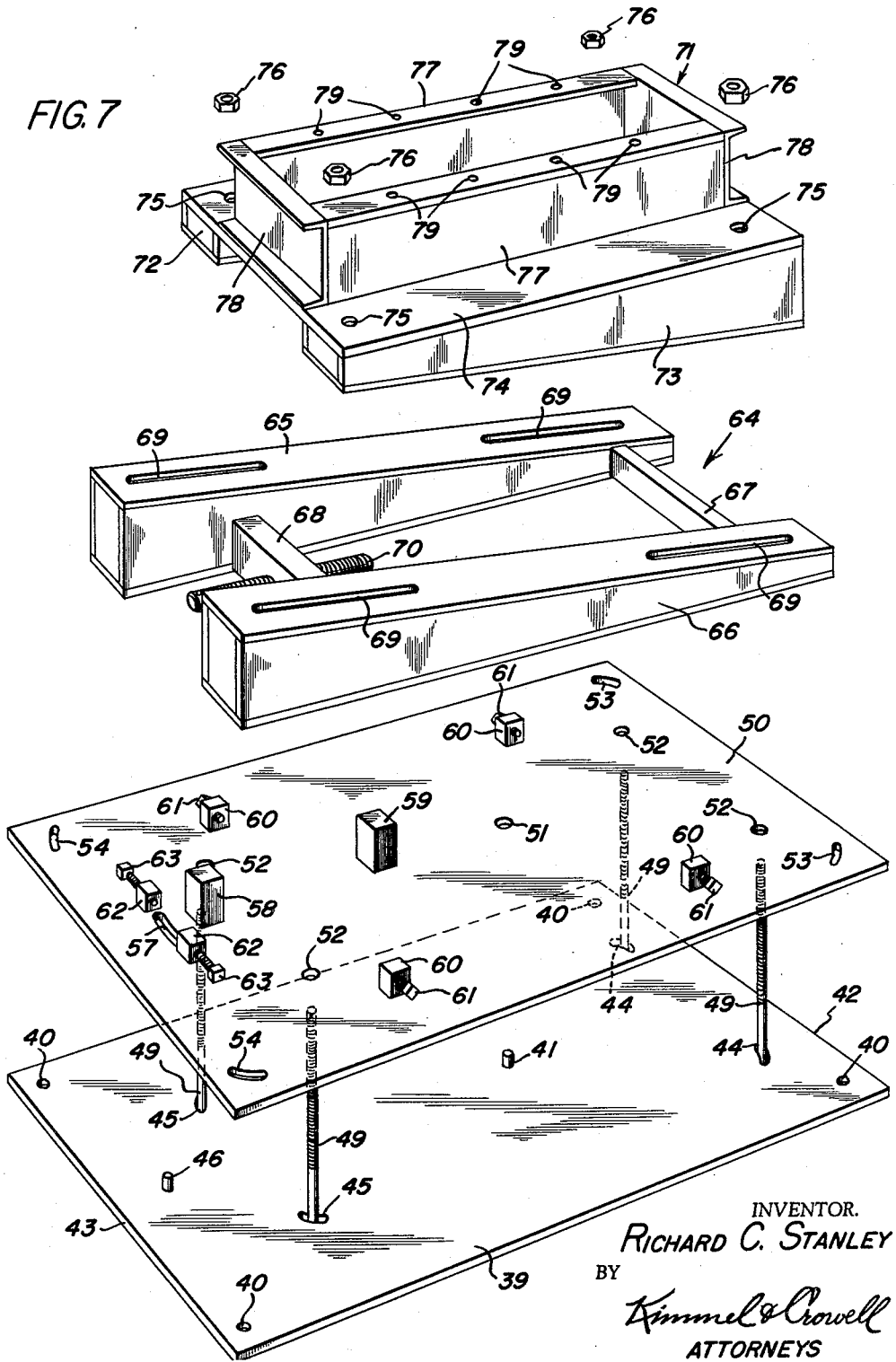

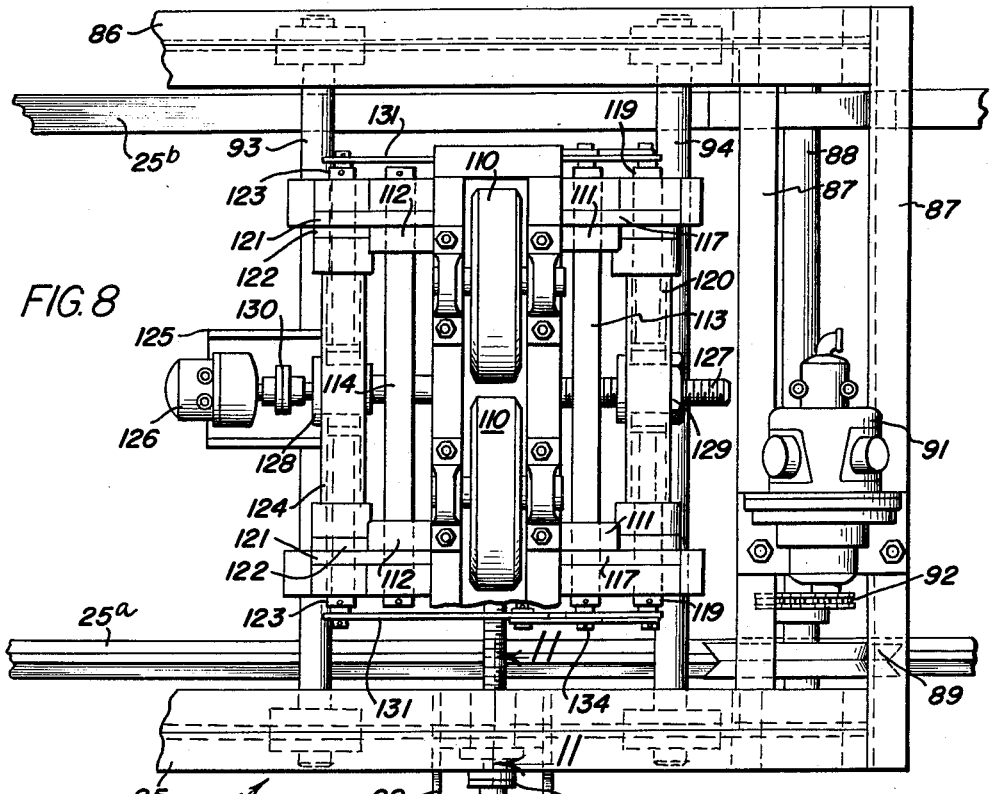
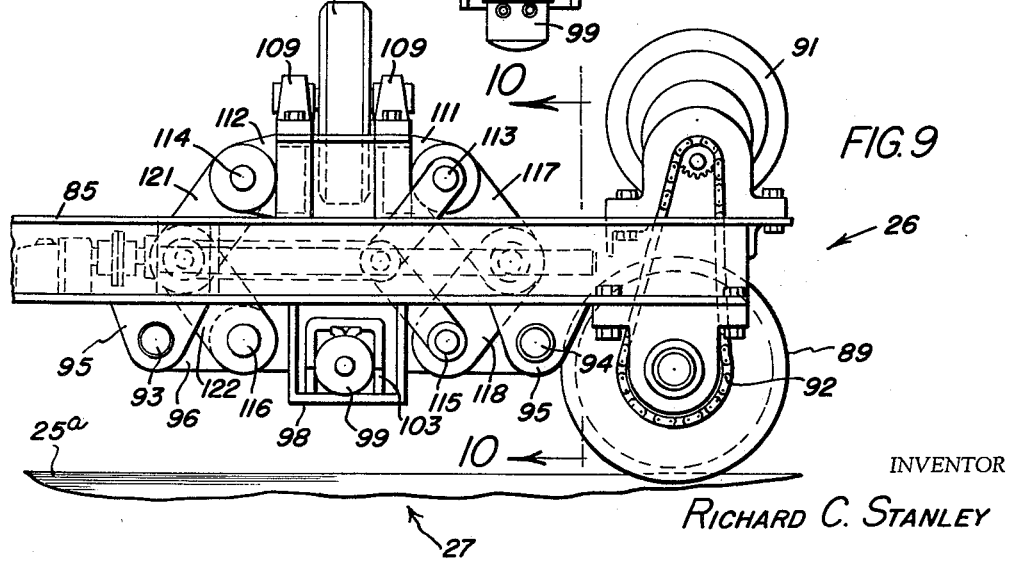

Nov. 14, 1961 R. C. STANLEY 3,008,439
PIPE ALIGNING AND SUPPORTING APPARATUS
Filed June 2, 1958 6 Sheets-Sheet 5

INVENTOR
RICHARD C. STANLEY
BY Kimmel & Crowell
ATTORNEYS

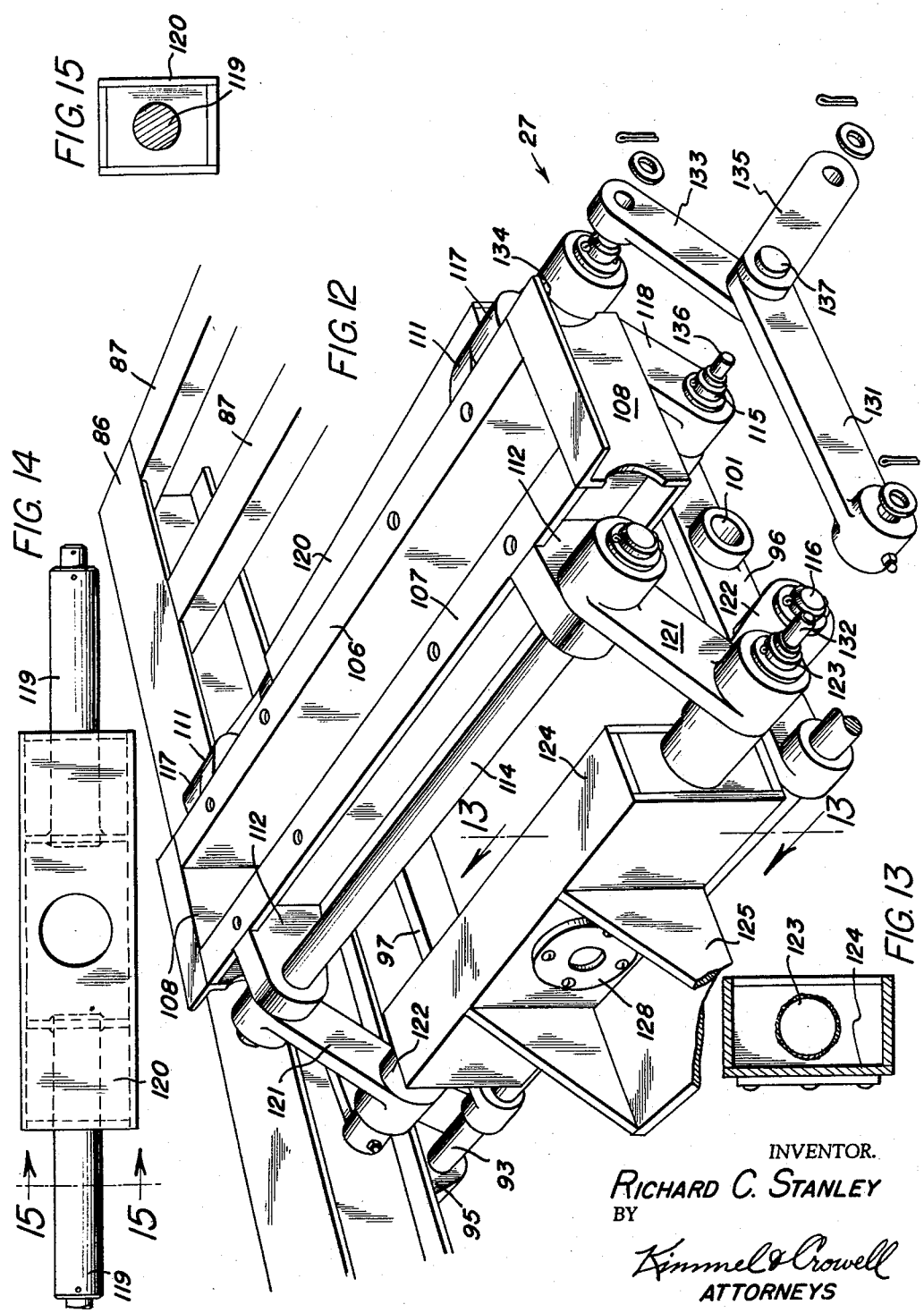

United States Patent Office 3,008,439
Patented Nov. 14, 1961

3,008,439
PIPE ALIGNING AND SUPPORTING
APPARATUS
Richard C. Stanley, 936 S. 11th St., Gadsden, Ala.
Filed June 2, 1958, Ser. No. 739,134
6 Claims. (Cl. 113—102)

The present invention relates to pipe aligning and supporting apparatus for use in welding lengths of pipe together in end-to-end relation.

The primary object of the invention is to provide a device for aligning and supporting lengths of pipe and rotating the pipe about its own axis during a welding operation.

Another object of the invention is to provide an apparatus of the class described above having means thereon for moving one length of pipe axially into contact with a second length of pipe.

A further object of the invention is to provide a pipe supporting and aligning apparatus in which the opposite ends of each length of a pair of pipe lengths may be individually vertically adjusted.

A still further object of the invention is to provide a pipe supporting and aligning device having remote control means for adjusting the alignment of the pipes.

Another object of the invention is to provide a pipe aligning and supporting apparatus which is inexpensive to manufacture, easy to operate, and which is completely effective in aligning the pipe lengths preparatory to welding.

Other objects and advantages will become apparent in the following specification when considered in the light of the attached drawings, in which:

FIGURE 1 is a top plan view of the invention shown partially broken away for convenience of illustration.

FIGURE 2 is a side elevation of the invention illustrated in FIGURE 1 shown partially broken away and in section for convenience of illustration.

FIGURE 3 is an enlarged fragmentary vertical section taken along the line 3—3 of FIGURE 2, looking in the direction of the arrows.

FIGURE 4 is an enlarged fragmentary vertical section taken along the line 4—4 of FIGURE 1, looking in the direction of the arrows.

FIGURE 7 is an exploded perspective view of the structure illustrated in FIGURES 5 and 6.

FIGURE 8 is a fragmentary top plan view of one end of the support carriage.

FIGURE 9 is a fragmentary side elevation of the structure illustrated in FIGURE 8.

FIGURE 12 is a partially exploded perspective view of the support carriage with the support rollers removed therefrom.

FIGURE 13 is a transverse fragmentary section taken along the line 13—13 of FIGURE 12, looking in the direction of the arrows.

FIGURE 14 is a side elevation of one of the elements of the invention.

FIGURE 15 is a transverse section taken along the line 15—15 of FIGURE 14, looking in the direction of the arrows.

Figure 5:
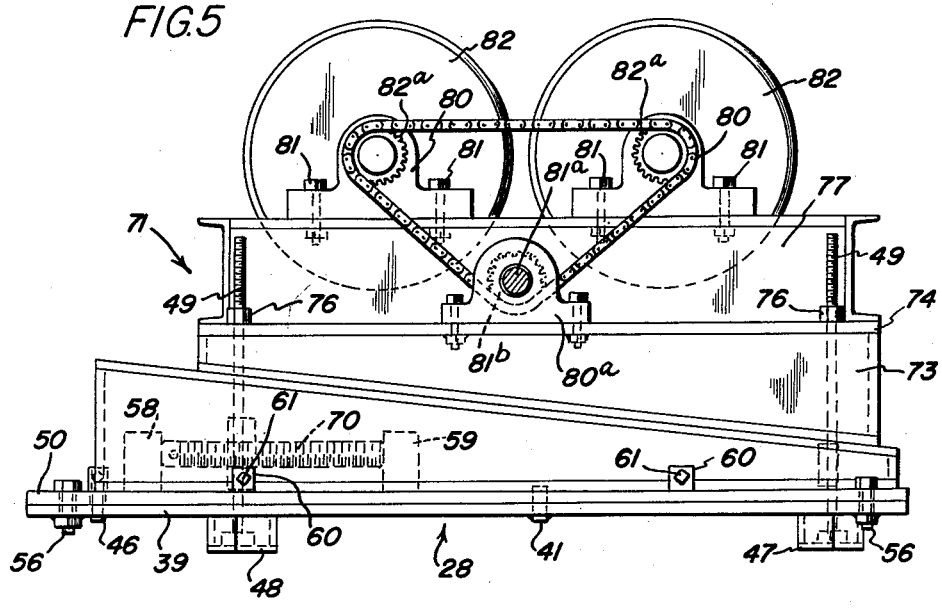
FIGURE 5 is a side elevation of one of the stationary pipe support stations.

Referring now to the drawings in detail wherein like reference characters indicate like parts throughout the several figures, the reference numeral 20 indicates generally a pipe aligning and supporting apparatus constructed in accordance with the invention.

The pipe aligning apparatus 20, illustrated in FIGURES 1 and 2, includes a plurality of pipe support rails 21 arranged in spaced apart parallel relation and each comprising an I-beam 22 having an inverted V-shaped angle iron member 23 welded to the upper surface thereof, as illustrated in FIGURE 4. The rails 21 are each gapped at 24, for reasons to be assigned.

The rails 21 all lie substantially in the same horizontal plane, and a pair of railroad rails 25 are positioned below the plane of the rails 21 extending transversely thereto in equispaced relation on opposite sides of the gap 24 in the rails 21. One of the pair of rails 25 has an inverted V-shaped upper surface 25a and the other has a substantially flat upper surface 25b. A pipe support carriage 26 is mounted on the rails 25 for transverse movement with respect to the rails 21. The pipe support carriage 26 has a pipe support station 27 mounted on each end thereof.

A stationary pipe support station 28 is positioned beneath the plane of the rails 21 and is generally aligned with the gaps 24 in the rails 21. A second stationary pipe support station 29 is positioned beneath the plane of the rails 21 and in generally aligned relation with the gap 24 therein. The stationary pipe support stations 28, 29 receive a section of pipe 30 from a pair of rails 21, and the pipe support stations 27 receive a second section of pipe 31 from a second pair of the rails 21. By movement of the carriage 26 along the rails 25, the pipe section 30 and the pipe section 31 can be engaged together at 32 to permit them to be welded together.

By positioning the pipe support stations 27, 28 and 29 in aligned relation with respect to the gap 24 in the rails 21, the pipe sections 30, 31 can drop off of the rails 21 onto the pipe support stations 27, 28 and 29 where they are supported out of contact with the rails 21.

Following the welding together at 32 of the pipe sections 30, 31, the pipe sections 30, 31 are lifted back onto the rails 21 on the opposite side of the gap 24 by means of a jack generally indicated at 33. The jack 33 includes a standard 34 positioned below the pipe 30, a pneumatic jack 35 arranged in spaced relation thereto, and a lever 36 pivotally connected at 37 to the standard 34 and having its opposite end pivotally connected at 38 to the jack 35. Operation of the pneumatic jack 35 will raise the lever 36 to the position shown in dotted lines urging the pipe sections 30, 31 onto the rails 21 for movement on to a storage and shipping point.

Figure 6:
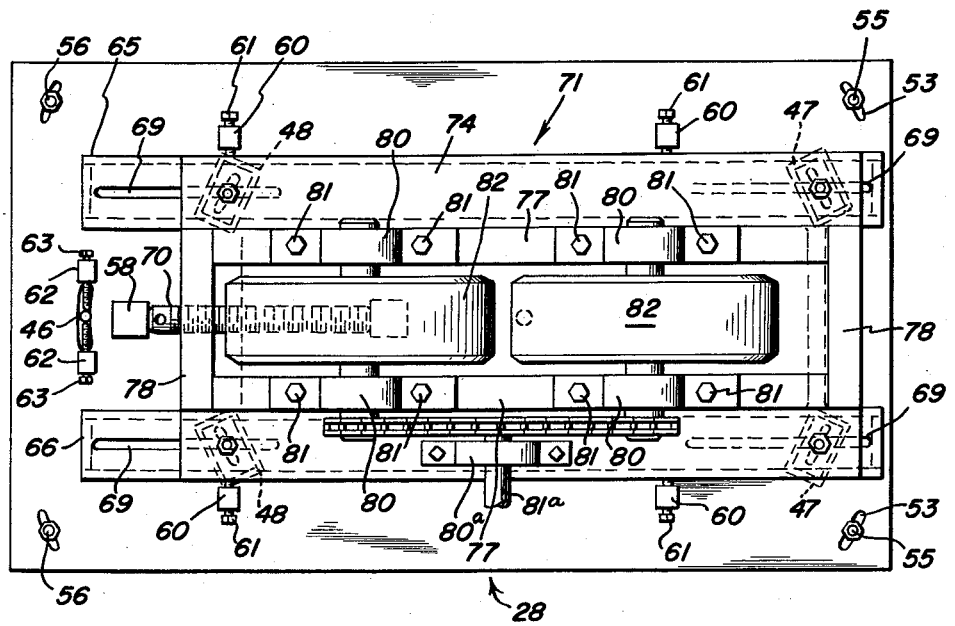
FIGURE 6 is a plan view of the structure illustrated in FIGURE 5.

The stationary pipe support station 28 is illustrated in detail in FIGURES 5 through 7, and includes a generally rectangular foundation plate 39 secured by any suitable means (not shown) to the supporting surface. The foundation plate 39 is provided with a vertical bore 40 adjacent each corner thereof.

The foundation plate 39 is provided with a cylindrical pin 41 positioned intermediate the opposite side edges thereof and somewhat closer to the end 42 of the foundation plate 39 than the end 43 thereof.

A pair of arcuate slots 44 are formed in laterally spaced relation in the foundation plate 39 adjacent the end 42 thereof. A second pair of laterally spaced slots 45 are formed in the foundation plate 39 adjacent the end 43 thereof. The slots 44, 45 all lie in a single circle, the center of which is the center of the pin 41.

A pin 46 is fixed to the foundation plate 39 intermediate the opposite side edges thereof and closely adjacent the end 43 thereof. A rectangular box 47 is secured to the foundation plate 39 underlying the slots 44 and communicating therewith. An identical rectangular box 48 is secured to the foundation plate 39 underlying each of the slots 45 and communicating therewith.

An elongated bolt 49 extends upwardly through each of the slots 44, 45 and the bolts 49 have their heads respectively positioned in and secured against rotation by the boxes 47, 48. The bolts 49 are adapted to move about the pin 41 in the arc of the circle on which the slots 44 and 45 are formed.

A generally rectangular base plate 50 of the same size and shape as the foundation plate 39 is positioned in contacting relation with the plate 39 having a bore 51 through which the pin 41 extends, and a plurality of bores 52 through which the bolts 49 extend. The base plate 50 is provided with a pair of arcuate slots 53 arranged to overlie the bores 40 at the end 42 of the foundation plate 39, and a second pair of arcuate slots 54 arranged to overlie the bores 40 at the end 43 of the foundation plate 39. The arcuate slots 53 lie in a circle, the center of which is the bore 51, and the arcuate slots 54 lie in a somewhat larger circle, the center of which is the bore 51.

A pair of bolts 55 extend through the bores 40 at the end 42 of the foundation plate 39 and through the arcuate slots 53, while a second pair of bolts 56 extend through the bores 40 at the end 43 of the foundation plate 39 and through the arcuate slots 54 to lock the base plate 50 to the foundation plate 39. The pin 46 extends upwardly through an arcuate slot 57 positioned intermediate the opposite sides of the base plate 50 and lying in a circle, the center of which is the bore 51.

As can be seen from the description, the plate 50 is positioned on the plate 39 and can be rotatably adjusted by the journalling of the bore 51 on the pin 41 to a limited degree.

A pair of upstanding rectangular bosses 58, 59 are positioned intermediate the opposite side edges of the base plate 50 in longitudinally spaced relation adjacent the end of the plate 50 carrying the slot 57. Four generally rectangular upstanding bosses 60 are arranged in laterally and longitudinally spaced relation fixed to the base plate 50 on the upper side thereof. Each of the bosses 60 is provided with a transverse set screw 61.

A rectangular boss 62 is mounted on the base plate 50 at each end of the slot 57 and are each provided with transversely extending set screws 63.

A wedge assembly generally indicated at 64 comprises a pair of wedge members 65, 66 connected together by a bar 67 adjacent the thin end thereof, and a second bar 68 adjacent to but spaced from the opposite end thereof. The wedge members 65, 66 are each hollow and are parallel to each other. The wedge members 65, 66 are provided with longitudinally extending elongated slots 69 through which the bolts 49 extend.

The wedge assembly 64 rests on the base plate 50 and is arranged to slide longitudinally thereon to the extent permitted by the slots 69 engaging the bolts 49. A threaded shaft 70 extends longitudinally through the bar 68 and has its opposite ends engaged with the bosses 58, 59, respectively, so that on turning movement of the shaft 70 the wedge assembly 64 is caused to move longitudinally on the base plate 50.

A roll support, generally indicated at 71, is provided with a pair of spaced apart parallel wedge blocks 72, 73 arranged in depending relation beneath a support plate 74. A bore 75 extends through each corner of the support plate 74 and through the wedge blocks 72, 73 lying thereunder. The bores 75 engage over the bolts 49 and a nut 76 secures the roll support 71 to the wedge assembly 64.

The roll support 71 can be vertically adjusted with respect to the base plate 50 by sliding the wedge assembly 64 longitudinally.

A pair of spaced apart parallel longitudinally extending channel members 77 are secured to the support plate 74 and have their opposite ends connected by transversely extending channels 78. A plurality of bores 79 are formed in the upper edges of the channels 77, for reasons to be assigned.

A bearing block 80 is fixed to each end of each of the channels 77 by means of bolts 81 which extend through the bores 79. A ransome roll 82 is journalled in aligned pairs of bearing blocks 80, as can be best seen in FIGURES 5 and 6.

With the use of the support station 28, the rolls 82 can be swung about a vertical pivot and can be elevated and lowered in the following manner.

To rotate the base plate 50 on the foundation plate 39, the bolts 55 and 56 and the nuts 76 are loosened and the set screws 63 are adjusted, bearing against the pin 46 to rotate the base plate 50 on the foundation plate 39 to the extent that the arcuate slots 53, 54, 44, 45 will permit.

To adjust the height of the ransome rolls 82, the set screws 61 are loosened as well as the nuts 76, and by turning the threaded shaft 70, the wedge assembly 64 is longitudinally moved on the base plate 50. Obviously, the cooperating wedge blocks 72, 73 and the wedge members 65, 66 cause the roll support 71 to be raised or lowered depending upon the direction of movement of the wedge assembly 64.

After the wedge assembly 64 is adjusted to the height desired, the set screws 61 engage the opposite sides of the wedge members 65, 66 and the nuts 76 are drawn down tight to lock the rolls 82 in adjusted position. The ransome rolls 82 revolve freely in the bearing blocks 80 and support the pipe sections 30 therebetween.

The pipe support station 29 is identical to the pipe support station 28 except that an electric motor 83 is mounted on one end thereof. The ransome rolls 82 are each provided with a sprocket 82a. A bearing block 80a is mounted on the adjacent edges of each of the support plates 74 intermediate the ransome rolls 82 and the bearing blocks 80a support the opposite ends of a shaft 81a extending between the support stations 28, 29.

A sprocket 81b is mounted on each end of the shaft 81a and a chain 84 is trained about the sprockets 81b, 82a at each end of the shaft 81a. The chain 84 on the support station 29 is connected to the motor 84 so that the ransome rolls 82 rotate in unison.

The carriage 26 includes a pair of longitudinally extending spaced apart parallel I-beams 85, 86 connected by a plurality of transversely extending frame members 87. An axle 88 extends transversely of the carriage 26 carrying a pair of wheels 89, one wheel 89a, at one end thereof having a V-shaped tread and at the other end thereof the other wheel 89b having a flat tread (see FIG. 10). The wheel 89a engages the surface 25a and the wheel 89b engages the surface 25b. The opposite ends of the axle 88 are journalled in bearing boxes 90 at opposite ends of the I-beams 85, 86.

An electric drive motor 91 is supported on the transverse frame members 87 adjacent one end of the carriage 26 and is coupled to one of the axles 88 by a drive chain 92. Operation of the electric motor 91 is effective to move the carriage 26 longitudinally on the rails 25 to bring the pipe section 31 into contact with the pipe section 30 in the position illustrated in FIGURE 2.

The pipe support stations 27, at each end of the carriage 26, are identical and only one of these stations is described in detail.

The pipe support station 27 includes a pair of spaced apart transversely extending cylindrical bars 93, 94 positioned adjacent one end of the carriage 26 and having their opposite ends supported in ears 95 fixed to and depending from the I-beams 85, 86.

A pair of horizontal longitudinally extending spaced apart foundation bars 96, 97 have their opposite ends slidably mounted on the bars 93, 94.

A support bracket 98 is secured to the I-beam 85 in depending relation thereto and has an electric motor 99 supported thereon. A threaded shaft 100 is threaded through a nut 101 (see FIG. 12) formed centrally on the foundation bar 96 and has its opposite end supported in a bearing 102 secured to a plate 103 forming part of the support bracket 98. The outer end 104 of the threaded shaft 100 is releasably coupled to the electric motor 99 by means of a flexible coupling 105 so that on rotation of the electric motor 99, the foundation bar 96 will be caused to move a limited amount transversely on the cylindrical bars 93, 94.

Figure 10:
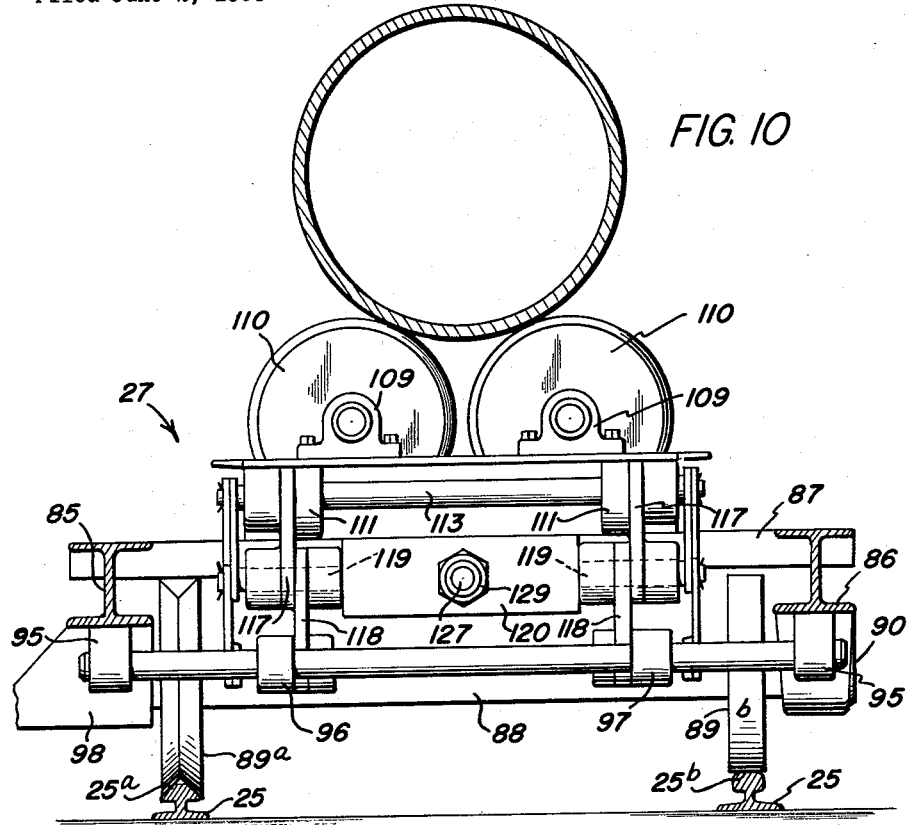
FIGURE 10 is a fragmentary transverse vertical section taken along the line 10—10 of FIGURE 9, looking in the direction of the arrows.
Figure 11:
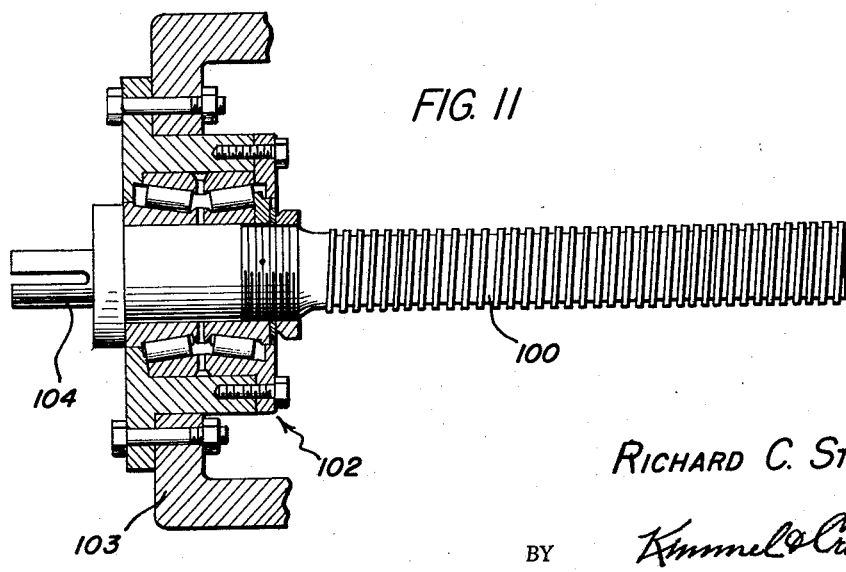
FIGURE 11 is an enlarged fragmentary vertical section taken along the line 11—11 of FIGURE 8, looking in the direction of the arrows.

A pair of horizontal transversely extending spaced apart parallel ransome roll support channels 106, 107 have their opposite ends connected by headers 108. Bearing blocks 109 are secured to the channels 106, 107, respectively, and have ransome rolls 110 journalled therein, as best seen in FIGURES 8 and 10.

The channel 106 is provided with a pair of outwardly extending ears 111 and the channel 107 is similarly provided with a pair of spaced apart outwardly extending ears 112. The ears 111, 112 are arranged in respectively aligned relation on opposite sides of the channels 106, 107, as best seen in FIGURE 8.

A transversely extending shaft 113 is fixedly mounted in the ears 111 in generally horizontal position. A transversely extending horizontal shaft 114 is fixedly mounted in the ears 112, for reasons to be assigned. A shaft 115 extends parallel to and directly underlies the shaft 113 having its opposite ends fixedly supported by the foundation bars 96, 97. A shaft 116 directly underlies and extends parallel to the shaft 114 and has its opposite ends fixedly supported in the foundation bars 96, 97.

A pair of links 117 each have one end journalled on the opposite ends of the shaft 113. A pair of links 118 each have one end journalled on the opposite ends of the shaft 115. The links 117, 118 are slightly offset transversely and have the free ends thereof journalled on cylindrical oppositely extending stub shafts 119 secured in axial alignment on a rectangular support member 120.

A pair of links 121 each have one end thereof journalled on opposite ends of the shaft 114, and a pair of links 122 each have one end thereof journalled on opposite ends of the shaft 116. The free ends of the links 121, 122 are journalled on stub shafts 123 fixedly secured in axial alignment on opposite ends of a rectangular support member 124.

An outwardly extending bracket 125 is fixedly secured to the rectangular support member 124 intermediate the opposite ends thereof and has an electric motor 126 supported thereon. A threaded shaft 127 has one end thereof supported in a bearing 128 mounted in the rectangular support member 124, and the opposite end threaded through a nut 129 fixedly supported in the rectangular support member 120.

The threaded shaft 127 is connected to the electric motor 126 by means of a flexible coupling 130 so that upon rotation of the electric motor 126 the rectangular support member 120 and the rectangular support member 124 are drawn inwardly toward each other pivoting the links 117, 118, 121, 122 to raise the channels 106, 107 with respect to the foundation bars 96, 97 and vertically adjust the ransome rolls 110.

The links 117, 118, 121, 122 are maintained in aligned relation by means of a horizontally extending guide link 131 journalled on a stub shaft 132 fixed to the end of the shaft 123. A link 133 is journalled on a stub shaft 134 fixed to the end of the shaft 113, and a similar link 135 is journalled on a stub shaft 136 fixed to the end of the shaft 115. The links 133, 135 have the free ends thereof secured to the free end of the guide link 131 by means of a pivot pin 137.

As can be readily seen from the construction of the invention, the operation of the electric motor 99 is effective to move the ransome rolls 110 transversely of the carriage 26, while operation of the electric motor 126 is effective to move the ransome rolls 110 vertically with respect to the carriage 26.

In the use and operation of the invention, pipe sections 30, 31 are rolled down the rails 21 until they are supported on the ransome rolls 82, 110 in the position illustrated in FIGURE 2. In this position, the pipe sections 30, 31 are welded together at 32 by means of an external welding apparatus and by means of an internal welding apparatus to completely seal the joint 32. The various adjustments available at the stations 27, 28, 29 make it possible to align the pipe sections 30, 31 with extreme accuracy even though the pipe sections 30, 31 may be distorted or otherwise misshapen so as to be difficult to align in ordinary equipment.

It should be understood that the motor 83 driving the ransome rolls 82 can be synchronously controlled in conjunction with the operation of an internal welding device where such is desirable.

Having thus described the preferred embodiments of the invention, it should be understood that numerous structural modifications and adaptations may be resorted to without departing from the scope of the appended claims.

What is claimed is:

1. A pipe support and aligning apparatus comprising a pair of longitudinally spaced substantially fixed pipe supporting stations, a longitudinally extending carriage mounted for longitudinal movement with respect to said stations and arranged in longitudinally aligned relation to said stations, a second pair of longitudinally spaced pipe supporting stations fixedly mounted on opposite ends of said carriage, means for moving said carriage and said second pair of pipe supporting stations longitudinally as a unit, a pair of laterally spaced apart rolls fixed with respect to each other mounted on each of said stations with their axes parallel and extending longitudinally, means for transversely adjusting each pair of rolls on its respective one of said second pair of stations, and means for vertically adjusting each pair of rolls on its respective one of said first and said second pair of stations, whereby a pipe supported on the rolls on said second pair of stations may have an end thereof accurately aligned with an end of a pipe supported on the rolls on said first pair of stations.

2. A device as claimed in claim 1 wherein means are provided mounting the pair of rolls on each of said substantially fixed stations for limited rotatable adjustment about a fixed vertical axis, said last-mentioned means including a pair of superposed base plates, the upper of said plates having arcuate slots therein, and bolts carried by the other of said plates extended through said slots.

3. A device as claimed in claim 1 wherein power means are provided for continuously rotating at least one pair of said rolls mounted on said first pair of stations.

4. A device as claimed in claim 1 wherein the means for vertically adjusting the rolls mounted on said first pair of stations comprises a base plate, a transversely slidable wedge member supported on said base plate, a roll supporting base having a wedge shaped lower face supported on said wedge member, and means for anchoring said roll supporting base to said base plate to prevent movement therebetween.

5. A device as claimed in claim 4 wherein means extending between said base plate and said wedge member are provided for moving said wedge member on said base plate.

6. A device as claimed in claim 1 wherein the vertical adjusting means for said pair of rolls on said second pair of stations includes a stationary frame, a movable frame, toggle links interconnecting said movable frame and said stationary frame, and power means for moving said movable frame vertically with respect to said stationary frame.

References Cited in the file of this patent

UNITED STATES PATENTS

| | | |
|---|---|---|
| 1,891,127 | Wallis | Dec. 13, 1932 |
| 2,500,204 | Ronay | Mar. 14, 1950 |
| 2,582,011 | Cunningham | Jan. 8, 1952 |
| 2,730,796 | Menser | Jan. 17, 1956 |